(12) United States Patent
Blatt et al.

(10) Patent No.: US 12,212,652 B2
(45) Date of Patent: Jan. 28, 2025

(54) PRIVACY PRESERVING COLUMN BINDING IMPLEMENTATION

(71) Applicant: Duality Technologies, Inc., Maplewood, NJ (US)

(72) Inventors: Marcelo Blatt, Modiin (IL); Oded Rosolio, Ra'anana (IL); Lior Liram, Tel Aviv (IL)

(73) Assignee: Duality Technologies, Inc., Maplewood, NJ (US)

(*) Notice: Subject to any disclaimer, the term of this patent is extended or adjusted under 35 U.S.C. 154(b) by 190 days.

(21) Appl. No.: 17/965,505

(22) Filed: Oct. 13, 2022

(65) Prior Publication Data
US 2023/0116306 A1 Apr. 13, 2023

Related U.S. Application Data

(60) Provisional application No. 63/255,061, filed on Oct. 13, 2021.

(51) Int. Cl.
*H04L 9/08* (2006.01)
*H04L 9/00* (2022.01)
(52) U.S. Cl.
CPC ............ *H04L 9/008* (2013.01); *H04L 9/0869* (2013.01)

(58) Field of Classification Search
CPC ..... H04L 9/008; H04L 9/0869; H04L 9/0861; H04L 9/0891; H04L 9/08
See application file for complete search history.

(56) References Cited

U.S. PATENT DOCUMENTS

| | | | |
|---|---|---|---|
| 2017/0272235 A1* | 9/2017 | Bhagwan | H04L 9/0618 |
| 2018/0254893 A1* | 9/2018 | Saxena | H04L 9/083 |
| 2022/0255764 A1* | 8/2022 | Li | G06F 21/606 |

\* cited by examiner

*Primary Examiner* — Quazi Farooqui
(74) *Attorney, Agent, or Firm* — PEARL COHEN ZEDEK LATZER BARATZ LLP

(57) ABSTRACT

Methods and systems for improving homomorphic encryption include: receiving, by a computing device, a data set from at least two or more computing devices, each data set comprising: a plurality of encrypted identifiers, and a number indicating the number of the plurality of encrypted identifiers; creating, by the computing device, a single data set including each of the received data sets; creating, by the computing device, a common identifier vector that indicates each encrypted identifier in the single data set that has underlying unencrypted data that is the same in more than one of the received data sets; and transmitting, by the computing device, the common identifier vector to each of the at least two or more computing devices.

14 Claims, 6 Drawing Sheets

100

| 102 | RECEIVING, BY A COMPUTING DEVICE, A DATA SET FROM AT LEAST TWO OR MORE COMPUTING DEVICES, EACH DATA SET COMPRISING: A PLURALITY OF ENCRYPTED IDENTIFIERS, AND A NUMBER INDICATING THE NUMBER OF THE PLURALITY OF ENCRYPTED IDENTIFIERS |

| 104 | CREATING, BY THE COMPUTING DEVICE, A SINGLE DATA SET INCLUDING EACH OF THE RECEIVED DATA SETS |

| 106 | CREATING, BY THE COMPUTING DEVICE, A COMMON IDENTIFIER VECTOR THAT INDICATES EACH ENCRYPTED IDENTIFIER IN THE SINGLE DATA SET THAT HAS A MATCH IN MORE THAN ONE OF THE RECEIVED DATA SETS |

| 108 | TRANSMITTING, BY THE COMPUTING DEVICE, THE COMMON IDENTIFIER VECTOR TO EACH OF THE AT LEAST TWO OR MORE COMPUTING DEVICES |

| RECEIVING, BY THE COMPUTING DEVICE, FROM THE AT LEAST TWO OR MORE COMPUTING DEVICES ADDITIONAL DATA BASED ON THE COMMON IDENTIFIER VECTOR | 110 |

| COMPUTING, BY THE COMPUTING DEVICE, AN INTERSECTION OF ONE OR MORE COMMON IDENTIFIERS USING THE COMMON IDENTIFIER VECTOR, THE SINGLE DATA SET AND THE ADDITIONAL DATA FROM THE AT LEAST TWO OR MORE COMPUTING DEVICES | 112 |

FIG. 1B

PRIVACY PRESERVING COLUMN BINDING IMPLEMENTATION

CROSS-REFERENCE TO RELATED APPLICATIONS

This application claims the benefit of and priority to U.S. Provisional Patent Application No. 63/255,061 filed Oct. 13, 2021, which is owned by the assignee of the instant application and incorporated herein by reference in its entirety.

FIELD OF THE INVENTION

The invention relates generally to improving homomorphic encryption, in particular maintaining privacy of users performing homomorphic operations on homomorphically encrypted data.

BACKGROUND

Homomorphic encryption can be used to protect private data. In some scenarios, it can be desirable for multiple different data owners to transmit data to a computation server to perform operations on the data. For example, a first data owner can have data associated with a user, and a second data owner can have data associated with the same user. It can be desirable for the data associated with the same user to be operated on.

Certain computations can involve multiple data columns, where each data column is distributed among several computing devices of data owners, the data may be grouped together as a prerequisite step to executing the computations. Typically, in these computations, only records that have common values (e.g., same user, same location, same date) in two or more data owners are used.

Typically, a column binding algorithm (such as inner-join in Structured Query Language (SQL)) is used to find group the data with common values. Colum binding algorithms can find an intersection between two or more of the data owners and/or put their common data in a particular order. Such algorithms, however, can require the different data owners to reveal some of their private data and thus privacy can be lost.

Therefore, it can be desirable to find an intersection between two or more different data owners without revealing private data. It can also be desirable to find the data based on common values where the common values can remain encrypted.

SUMMARY

Advantages of the invention can include determining which encrypted data has the same underlying values without unencrypting the data. Advantages of the invention can also include receiving a reduced amount of data from each of two or more data owners due to, for example, only receiving data that has a same identifier with another data set. Advantages of the invention can also include a reduction in a number of operations performed. Advantages of the invention can also include an increase in processing time.

According to one or more embodiments, there is provided a method for improving homomorphic encryption, the method comprising: receiving, by a computing device, a data set from at least two or more computing devices, each data set comprising: a plurality of encrypted identifiers, and a number indicating the number of the plurality of encrypted identifiers; creating, by the computing device, a single data set including each of the received data sets; creating, by the computing device, a common identifier vector that indicates each encrypted identifier in the single data set that has underlying unencrypted data that is the same in more than one of the received data sets; and transmitting, by the computing device, the common identifier vector and the single data set to each of the at least two or more computing devices.

According to some embodiments the method for improving homomorphic encryption further includes receiving, by the computing device, from the at least two or more computing devices additional data based on the common identifier vector; and computing, by the computing device, an intersection of one or more common identifiers using the common identifier vector, the single data set and the additional data from the at least two or more computing devices.

According to some embodiments, the received data further includes a plurality of placeholder identifiers, wherein each of the plurality of placeholder identifiers appears as if it is an encrypted identifier when being transmitted from the at least two or more computing devices, wherein the number of the plurality of placeholder identifiers is randomly generated for each of the received data, and wherein the number indicating the number of the plurality of encrypted identifiers is updated to add the number of the plurality of placeholder identifiers.

According to some embodiments, the plurality of encrypted identifiers are encrypted using a commutative encryption scheme or a deterministic encryption scheme.

According to one or more embodiments, there is provided a system for improving homomorphic encryption, the system comprising at least one processor and a memory containing instructions which, when executed by the at least one processor, cause the at least one processor to: receive, by a computing device, a data set from at least two or more computing devices, each data set comprising: a plurality of encrypted identifiers, and a number indicating the number of the plurality of encrypted identifiers; create, by the computing device, a single data set including each of the received data sets; create, by the computing device, a common identifier vector that indicates each encrypted identifier in the single data set that has underlying unencrypted data that is the same in more than one of the received data sets; and transmit, by the computing device, the common identifier vector to each of the at least two or more computing devices.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanied drawings. Embodiments are illustrated without limitation in the figures, in which like reference numerals indicate corresponding, analogous, or similar elements, and in which:

FIG. 1A and FIG. 1B show a method for improving homomorphic encryption, according to some embodiments of the invention;

Figure 2:
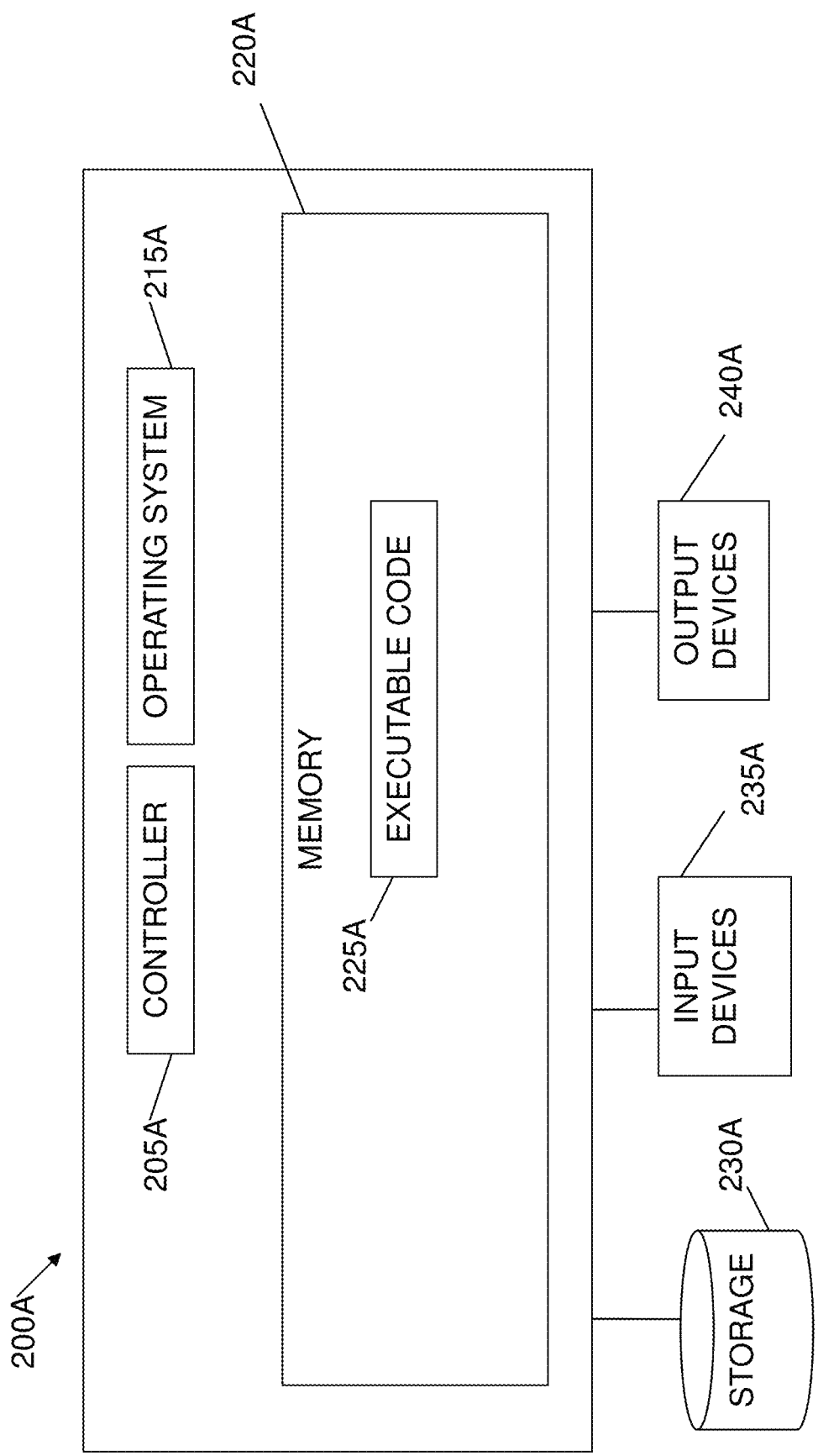
FIG. 2 is a block diagram of an exemplary computing device for improving homomorphic encryption, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In general, the invention can provide an improved homomorphic encryption which can be used in performing homomorphic operations on homomorphically encrypted data in a privacy preserving manner.

In general, the invention can provide efficient and/or secure systems for performing homomorphic operations, e.g. column binding computations, on homomorphically encrypted data in a privacy preserving manner.

FIG. 1A and FIG. 1B show a method a method 100 for improving (e.g., via computing device 200A shown in FIG. 2 herein) homomorphic encryption on at least one homomorphically encrypted ciphertext, according to some embodiments of the invention.

According to some embodiments, method 100 includes receiving, by a computing device (e.g., via computing device 200A as shown in FIG. 2 herein), a data set from at least two or more computing devices (e.g., via computing device 200A as shown in FIG. 2 herein).

In various embodiments, the data is integers, categorical data, floating point or fixed point data. In various embodiments, the data is encodings of imagery and/or audio data, medical records, and/or genomic information.

Each data set can include a plurality of encrypted identifiers, and a number indicating the number of the plurality of encrypted identifiers (Step 102). For example, assume a first data set has 10 encrypted identifiers, then the number of the plurality of encrypted identifiers is 10. The number of the plurality of encrypted identifiers can be used for encoding of the plaintext to, for example, ensure that a plaintext modulus is large enough so that every input value has a unique encoding. In some embodiments, the plaintext is encoded by the data owner. In some embodiments, the plaintext can be encoded at any computing device that decrypts the identifiers and then encrypts the identifiers again.

In some embodiments, each data set is encrypted using a commutative encryption scheme. In some embodiments, the commutative encryption of a plurality of identifiers leads to the same ciphertext, regardless of the order in which the plurality of identifiers are encrypted.

In some embodiments, each data set of the two or more computing devices is encrypted using the same encryption scheme by the two or more computing devices. In some embodiments, each data set is encrypted using a deterministic encryption scheme. In some embodiments, the deterministic encryption of a plurality of identifiers leads to the generation of the same ciphertext for the same identifier between different data owners. In various embodiments, the encryption scheme is any encryption scheme as known in the art.

In some embodiments, each data set may have been encrypted using a commutative and deterministic encryption scheme. For example, a commutative and deterministic encryption scheme can be an elliptic curve cryptography. In some embodiments, the commutative and deterministic encryption scheme generates a ciphertext for a plurality of identifiers, wherein the ciphertext for an encrypted identifier is always identical for the same identifier even among different data owners and further the encryption of a plurality of identifiers results in the same ciphertext regardless of the order of encryption of the plurality of identifiers.

In some embodiments, the encryption of a plurality of identifiers by each computing device of the at least two or more computing devices may have been performed jointly. Alternatively, the encryption of a plurality of identifiers by each computing device at least two or more computing devices may have been performed sequentially.

Figure 4A:
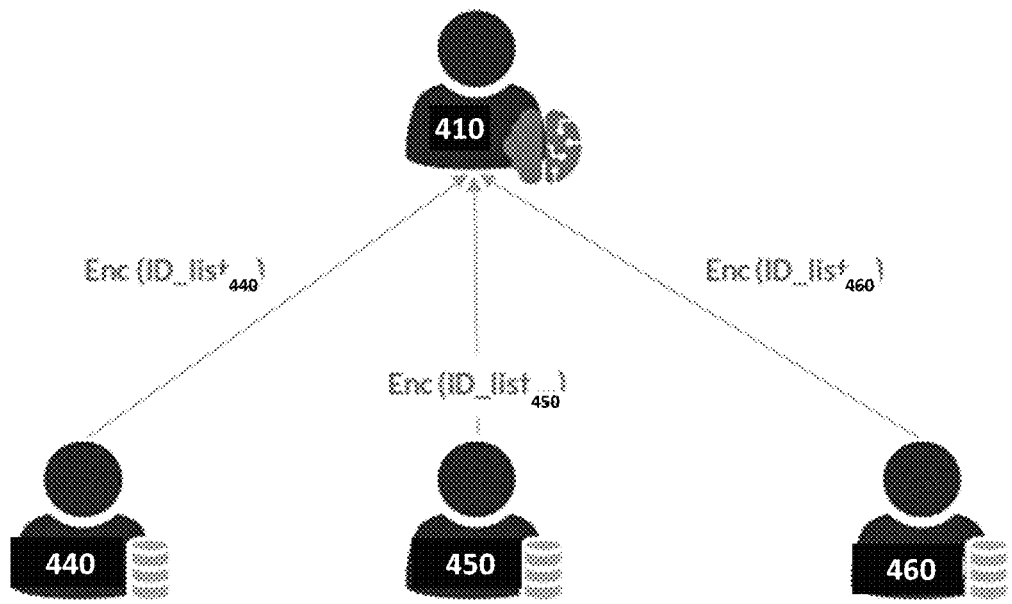
FIG. 4A shows an example of a system showing transmittal of encrypted identifiers, according to some embodiments of the invention.
Figure 4B:
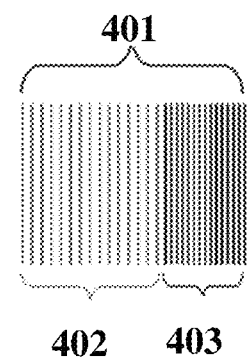
FIG. 4B is an example for a data set from two or more computing devices including a plurality of identifiers prior to encryption, according to some embodiments of the invention.

In various embodiments, one or more of the data sets from the two or more computing devices includes one or more placeholder identifiers. For example, turning to FIG. 4B, FIG. 4B shows an example for a data set 401 that includes a plurality of identifiers 402 and a plurality of placeholder identifiers 403 (e.g., fake or dummy identifiers). The data set 401 can have the plurality of identifiers 402 that relates to customers of an online store, for example, "customer ID", "billing address", "shipping address" and/or "product name," and a plurality of placeholder identifiers 403, such as "placeholder identifier 1" and placeholder identifier 2." The one or more placeholder identifiers may be added to the data set 401 prior to encryption to alter the number of identifiers for each data set. In this manner, during transmission of the data set, and thus the actual plurality of identifiers, the number of identifiers can be obscured.

In some embodiments, the number of the plurality of placeholder identifiers is randomly generated. In some embodiments, the number of the plurality of placeholder identifiers is deterministic. In some embodiments, each of the plurality of placeholder identifiers appears as if it is an encrypted identifier when being transmitted from the at least two or more computing devices. After encryption, the plurality of encrypted identifiers may include underlying unencrypted data that includes the plurality of placeholder identifiers. In some embodiments, the number indicating the number of the plurality of encrypted identifiers is updated to add the number of the plurality of placeholder identifiers. Thus, the number indicating the number of the plurality of encrypted identifiers may refer to the combined number of the plurality of encrypted identifiers and the plurality of encrypted placeholder identifiers.

Turning back to FIG. 1A, according to some embodiments, method 100 includes creating, by the computing device (e.g., via the computing device 200A as shown above in FIG. 2), a single data set including each of the received data sets (Step 104). The single data set may be generated from the plurality of encrypted identifiers from the data set from at least two or more computing devices. In some embodiments, a determination, using the computing device (e.g., via computing device 410 as shown in FIG. 4A) is performed on the single data set in its encrypted form to identify which corresponding underlying unencrypted data received from the two or more computing devices is the same.

In some embodiments, the determination (e.g., computation) as to whether the encrypted identifiers have the same underlying unencrypted data is based on a subtraction. For example, the value of each encrypted identifier may be subtracted from each other encrypted identifier included in the single data set. In the event that the subtraction results in a value of 0, the encrypted identifiers are indicated as having the same underlying unencrypted data. In the event that the subtraction does not result in a value of 0, the encrypted identifiers are indicated as having the different underlying unencrypted data.

For example, assume that data owner one sends encrypted data having underlying data that is a plurality of identifiers 10, 12, 14 from computing device one, and assume that data owner two sends encrypted data having underlying data that is a plurality of identifiers 10, 16, 18. A single set of data of the encrypted data from both data owner one and data owner two is formed including identifiers 10, 12, 14, 10, 16, and 18.

In some embodiments, encrypted identifiers that have been generated from placeholder identifiers are identified as placeholder identifiers. Placeholder identifiers may be ignored in the identification of commonalities in the plurality of encrypted identifiers. In some embodiments, placeholder identifiers are filtered out from the remaining encrypted identifiers.

According to some embodiments, method 100 includes creating, by the computing device (e.g., via the computing device 200A as shown above in FIG. 2), a common identifier vector that indicates each encrypted identifier in the single data set that has underlying unencrypted data that is the same in more than one of the received data sets (e.g., via the computing device 200A as shown above in FIG. 2) (Step 106).

For example—assuming a first data set and a second data set—the first data set has three encrypted identifiers and the second data set has four encrypted identifiers. The underlying data (e.g., the unencrypted data that is the actual identifier) for the first data set is 10, 12, 14, and for the second data set is 10, 11, 16, 19. After generation of a single data set and subtraction computations for each encrypted identifier of the remaining identifiers in the single data set, as described above, in this example, the common identifier vector can indicate that first data set and the second data set have the identifier 10 in common as follows: [1,0,0,0].

According to some embodiments, method 100 may include transmitting, by the computing device (e.g., via the computing device 200A as shown above in FIG. 2), the common identifier vector and/or the single data set to each of the at least two or more computing devices (Step 108). In some embodiments, the computing device (e.g. computing device 310 of FIG. 3) keeps a copy of the transmitted common identifier vector and the single data set on servers or storage devices connected to the computing device (e.g. one or more of servers or databases 315 of FIG. 3).

Figure 3:
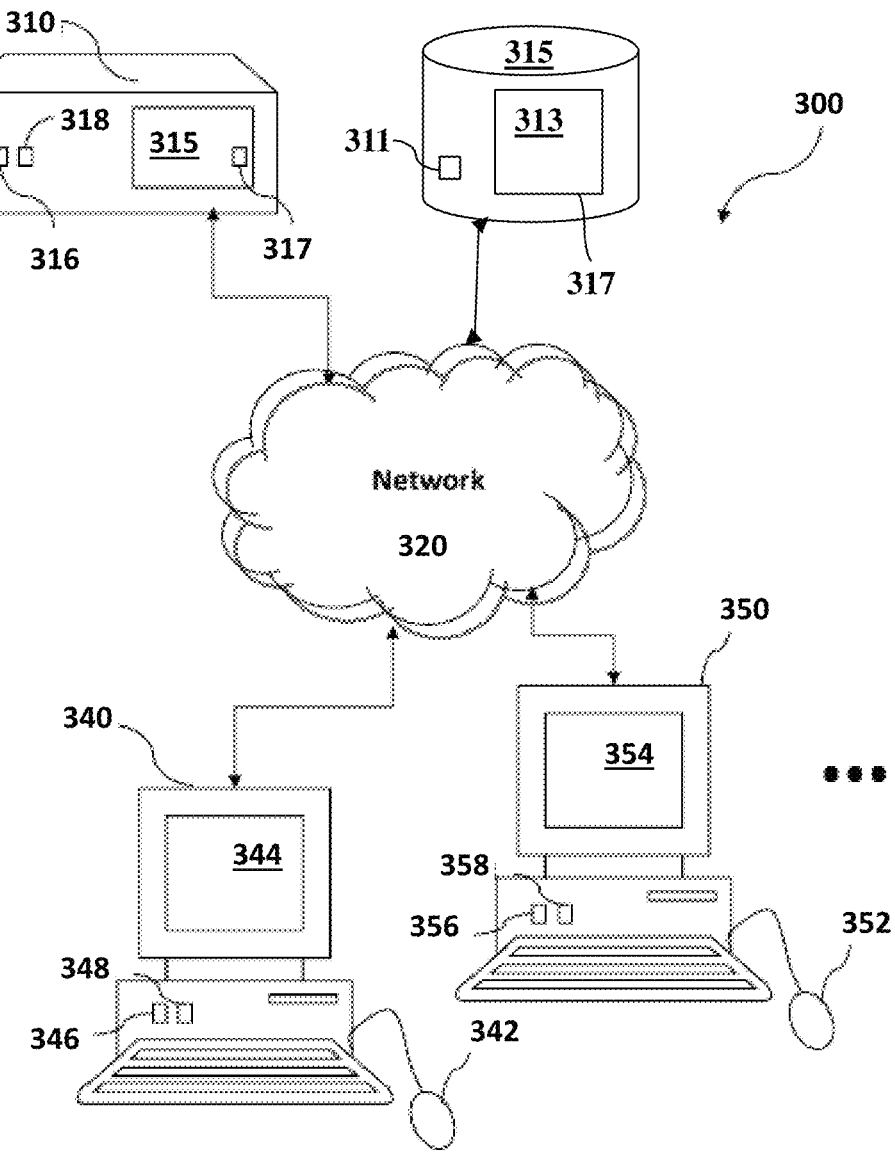
FIG. 3 is a schematic drawing of a system for improving homomorphic encryption, according to some embodiments of the invention.
Figure 5:
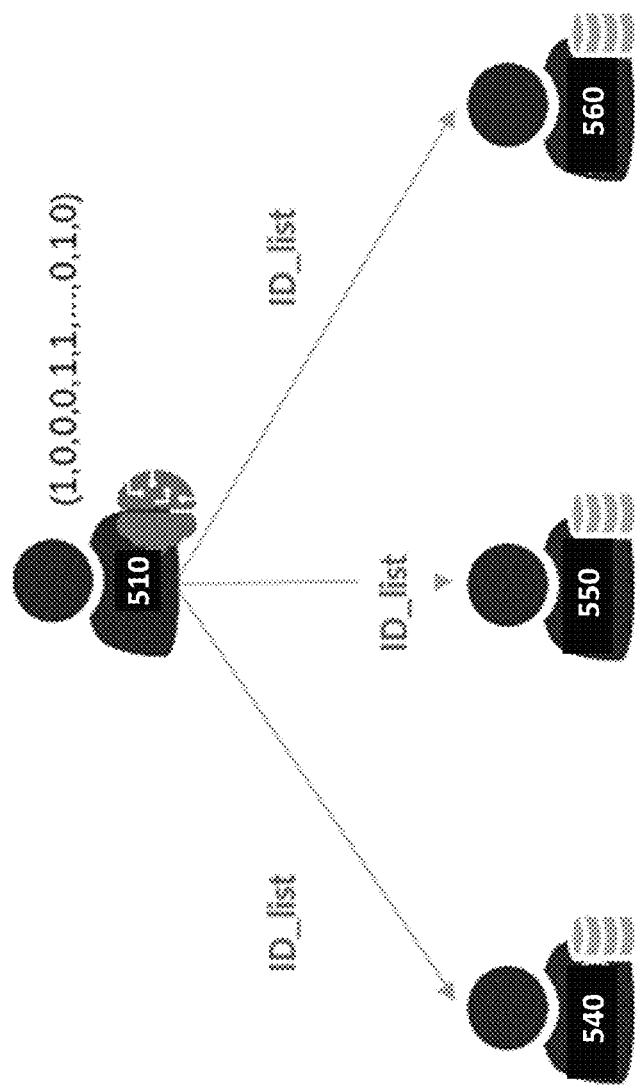
FIG. 5 shows an example of a system showing transmittal of a common identifier vector and the single data set, according to some embodiments of the invention.

Turning to FIG. 5, FIG. 5 shows an example of a system showing transmittal of a common identifier vector and the single data set, according to some embodiments of the invention: Computing device 510 can be connected to (e.g., via the network 320 as shown in FIG. 3 outlined below) computing devices 540, 550 and 560. During operation, assuming computing device 510 has received a plurality of data sets from the computing devices 540, 550 and 560, computing device 510 can create a single data set and a common identifier vector. The single data set and common identifier vector can be stored in a database (e.g. database 315 as shown in FIG. 3 outlined below). In some embodiments, the single data set and common identifier vector are stored in a memory unit of computing device 510 (e.g. memory unit 318 as shown in FIG. 3 outlined below). The common identifier vector and the single data set created by computing device 110 can be transmitted to the three computing devices 540, 550 and 560 (e.g. via the network 320 as shown in FIG. 3 shown below). Each of computing devices 540, 550 and 560 can receive the common identifier vector and the single data set, created by computing device 510.

Each computing device of the at least two or more computing devices may use the common identifier vector and the single data set to identify additional data in their data source, e.g. in a database. For example, when a computing device of the at least two or more computing devices receives a common identifier vector [1,0,0,0] and a corresponding encrypted single data set including underlying unencrypted data including identifiers "Tax ID", "Name", "Address" and "Date of Birth", the common identifier vector indicates that in the encrypted single data set the identifier "Tax ID" is common identifier. In this example, the computing device can find data that is associated with the identifier "Tax ID". For example, data associated with the identifier "Tax ID" can be a number of a Tax ID's listed under the identifier "Tax ID".

Turning to FIG. 1B, method 100 may further include (step 110) receiving, by the computing device, from the at least two or more computing devices additional data based on the common identifier vector. The additional data can be data associated with common identifiers.

In various embodiments, additional data received from the at least two or more computing devices is encrypted, decrypted or a combination.

In some embodiments, the additional data received by the computing device from the at least two or more computing devices only includes data that is related to one or more common identifiers part of the common identifier vector. In some embodiments, the additional data received by the computing device from the at least two or more computing devices includes primarily data that is related to one or more common identifiers part of the common identifier vector. In some embodiments, the additional data does not include data related to identifiers that are not common identifiers. In this manner, the data that is received by the computing device can reduced in comparison to sending all of the data for all identifiers from each data owner computing device. In some embodiments, additional is only be transmitted to the computing device from the at least two or more computing devices when the common identifier vector indicates that one or more encrypted identifiers in the single data set that has underlying unencrypted data is the same in more than one of the received data sets to, for example, avoid unnecessary transmission of data from any of the at least two or more computing devices to the computing device.

Method 100 may further include (step 112) computing, by the computing device, an intersection for one or more common identifiers of the common identifier vector based on the single data set and additional data from the two or more computing devices. In some embodiments, the computation of an intersection for one or more common identifiers is based on subtraction. The computation of an intersection can be performed as is known to those skilled in the art. In some embodiments, computing the intersection of one or more common identifiers includes allocating received additional data from at least two or more computing devices to one or more common identifiers of the common identifier vector. For example, when two computing devices of the two or more computing devices have identified (in step 108) the same common identifier, such as a "Tax ID", the additional data received from the two computing devices (in step 110) is allocated to the common identifier "Tax ID".

In some embodiments, computing the intersection of one or more common identifiers involves ordering the additional data. For example, additional data from the two or more computing devices can be ordered alphabetically or numerically. In some embodiments, computing the intersection of one or more common identifiers involves filtering the additional data based on a private set intersection. For example, additional data from the at least two or more computing devices allocated to the same common identifier may be filtered by removing additional data for a common identifier that is outside a given range for an intersection.

FIG. 2 shows a block diagram of an exemplary computing device which may be used with embodiments of the present invention. Computing device 200A may include a controller or computer processor 205A that may be, for example, a central processing unit processor (CPU), a chip or any suitable computing device, an operating system 215A, a memory 220A, a storage 230A, input devices 235A and output devices 240A such as a computer display or monitor displaying for example a computer desktop system.

Operating system 215A may be or may include code to perform tasks involving coordination, scheduling, arbitration, or managing operation of computing device 200A, for example, scheduling execution of programs. Memory 220A may be or may include, for example, a Random Access Memory (RAM), a read only memory (ROM), a Flash memory, a volatile or non-volatile memory, or other suitable memory units or storage units. At least a portion of Memory 220A may include data storage housed online on the cloud. Memory 220A may be or may include a plurality of different memory units. Memory 220A may store for example, instructions (e.g. code 225A) to carry out a method as disclosed herein. Memory 220A may use a datastore, such as a database.

Executable code 225A may be any application, program, process, task, or script. Executable code 225A may be executed by controller 205A possibly under control of operating system 215A. For example, executable code 225A may be, or may execute, one or more applications performing methods as disclosed herein, such as a machine learning model, or a process providing input to a machine learning model. In some embodiments, more than one computing device 200A or components of device 200A may be used. One or more processor(s) 205A may be configured to carry out embodiments of the present invention by for example executing software or code.

Storage 230A may be or may include, for example, a hard disk drive, a floppy disk drive, a compact disk (CD) drive, a universal serial bus (USB) device or other suitable removable and/or fixed storage unit. Data described herein may be stored in a storage 230A and may be loaded from storage 230A into a memory 220A where it may be processed by controller 205A. Storage 230A may include cloud storage. Storage 230A may include storing data in a database.

Input devices 235A may be or may include a mouse, a keyboard, a touch screen or pad or any suitable input device or combination of devices. Output devices 240A may include one or more displays, speakers and/or any other suitable output devices or combination of output devices. Any applicable input/output (I/O) devices may be connected to computing device 200A, for example, a wired or wireless network interface card (NIC), a modem, printer, a universal serial bus (USB) device or external hard drive may be included in input devices 235A and/or output devices 240A.

Embodiments of the invention may include one or more article(s) (e.g. memory 220A or storage 230A) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

FIG. 3 is a schematic drawing of a system 300, according to some embodiments of the invention. System 300 may include one or more server(s) 310, database(s) 315, and/or computer(s) 340, 350, . . . , etc. Any or all of system 300 devices may be connected via one or more network(s) 320. Network 320, which connects server(s) 310 and computers 340 and 350, may be any public or private network such as the Internet. Access to network 320 may be through wire line, terrestrial wireless, satellite or other systems well known in the art.

Server(s) 310 and computers 340 and 350, may include one or more controller(s) or processor(s) 316, 346, and 356, respectively, for executing operations according to embodiments of the invention and one or more memory unit(s) 318, 348, and 358, respectively, for storing data (e.g., encryption and/or decryption keys, and encrypted and/or decrypted data) and/or instructions (e.g., software for applying computations or calculations, keys to encrypt or decrypt data according to embodiments of the invention) executable by the processor(s). Processor(s) 316, 346, and/or 356 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 318, 348, and/or 358 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Computers 340 and 350 may be servers, personal computers, desktop computers, mobile computers, laptop computers, and notebook computers or any other suitable device such as a cellular telephone, personal digital assistant (PDA), video game console, etc., and may include wired or wireless connections or modems. Computers 340 and 350 may include one or more input devices 342 and 352, respectively, for receiving input from a user (e.g., via a pointing device, click-wheel or mouse, keys, touch screen, recorder/microphone, other input components). Computers 340 and 350 may include one or more output devices 344 and 354 (e.g., a monitor or screen) for displaying data to a user provided by or for server(s) 310.

Database 315 may include software processes or applications for storing and retrieving data 317 such as large-word data structures and large-work CKKS computations, and/or encryption and/or decryption keys. Data 317 may also include code (e.g., software code) or logic, e.g., to enable the application of large-work CKKS algorithms according to embodiments of the invention. Database 315 may be internal or external to one or more of server(s) 310 and/or computer(s) 340 and/or 350 (not shown) and may be connected thereto by a local or remote and a wired or wireless connection. In some embodiments, data 317 is stored in an alternate location separate from database 315, e.g., memory unit(s) 318, 348, and/or 358.

FIG. 4A shows an example of a system showing transmittal of encrypted identifiers, according to some embodiments of the invention. Computing device 410 is connected (e.g., via a network 320 as shown in FIG. 3 outlined below) to three computing devices 440, 450 and 460.

During operation, computing device 410 can receive a data set (e.g., the data sets as described above in FIG. 1A and FIG. 1B) from each computing device 440, 450 and 460. Each data sets can include a plurality of encrypted identifiers and a corresponding number indicating the number of the plurality of encrypted identifiers. Data received at computing device 410 can be stored at a storage device connected to computing device 410 (e.g., database 315 as shown in FIG. 3 as shown above). In various embodiments, each of the data sets from computing devices 440, 450 and 460 received at computing device 410 are stored in a memory unit of computing device 410 (e.g., memory unit 318 as shown in FIG. 3 outlined below) or in a memory unit of the corresponding computing device, e.g. for computing devices 340 and 350, memory units 348 and 358 as shown above in FIG. 3.

Any of system 300 devices may operate as a secure or insecure party. Secure parties may each securely store unencrypted (or encrypted) data and private keys associated with each dataset, party, etc. Insecure parties may not access the unencrypted data or private keys.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention may be carried out or practiced in various ways and that the invention may be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for improving homomorphic encryption, the method comprising:

receiving, by a computing device, a data set from at least two or more computing devices, each data set comprising:
   a plurality of encrypted identifiers, and
   a number indicating the number of the plurality of encrypted identifiers;
creating, by the computing device, a single data set including each of the received data sets;
creating, by the computing device, a common identifier vector that indicates each encrypted identifier in the single data set that has underlying unencrypted data that is the same in more than one of the received data sets;
transmitting, by the computing device, the common identifier vector to each of the at least two or more computing devices;
receiving, by the computing device, from the at least two or more computing devices additional data based on the common identifier vector; and
computing, by the computing device, an intersection of one or more common identifiers using the common identifier vector, the single data set and the additional data from the at least two or more computing devices.

2. The method of claim 1 wherein underlying unencrypted data is the same when the subtraction result of two of the plurality of identifiers is 0.

3. The method of claim 1 wherein the received data further comprises a plurality of placeholder identifiers,
   wherein each of the plurality of placeholder identifiers appears as if it is an encrypted identifier when being transmitted from the at least two or more computing devices,
   wherein the number of the plurality of placeholder identifiers is randomly generated for each of the received data, and
   wherein the number indicating the number of the plurality of encrypted identifiers is updated to add the number of the plurality of placeholder identifiers.

4. The method of claim 1 wherein the plurality of encrypted identifiers are encrypted using a commutative encryption scheme or a deterministic encryption scheme.

5. The method of claim 1 wherein the plurality of encrypted identifiers are encrypted using a commutative encryption scheme and a deterministic encryption scheme.

6. A system comprising at least one processor and a memory containing instructions which, when executed by the at least one processor, cause the at least one processor to:
   receive, by a computing device, a data set from at least two or more computing devices, each data set comprising:
     a plurality of encrypted identifiers, and
     a number indicating the number of the plurality of encrypted identifiers;
   create, by the computing device, a single data set including each of the received data sets;
   create, by the computing device, a common identifier vector that indicates each encrypted identifier in the single data set that has underlying unencrypted data that is the same in more than one of the received data sets;
   transmit, by the computing device, the common identifier vector to each of the at least two or more computing devices;
   receive, by the computing device, from the at least two or more computing devices additional data based on the common identifier vector; and
   compute, by the computing device, an intersection of one or more common identifiers using the common identifier vector, the single data set and the additional data from the at least two or more computing devices.

7. The system of claim 6, wherein underlying unencrypted data is the same when the subtraction result of two of the plurality of identifiers is 0.

8. The system of claim 6, wherein the received data further comprises a plurality of placeholder identifiers,
   wherein each of the plurality of placeholder identifiers appears as if it is an encrypted identifier when being transmitted from the at least two or more computing devices,
   wherein the number of the plurality of placeholder identifiers is randomly generated for each of the received data, and
   wherein the number indicating the number of the plurality of encrypted identifiers is updated to add the number of the plurality of placeholder identifiers.

9. The system of claim 6, wherein the plurality of encrypted identifiers are encrypted using a commutative encryption scheme or a deterministic encryption scheme.

10. The system of claim 6, wherein the plurality of encrypted identifiers are encrypted using a commutative encryption scheme and a deterministic encryption scheme.

11. A method for improving homomorphic encryption, the method comprising:
   receiving, by a computing device, a data set from at least two or more computing devices, each data set comprising:
     a plurality of encrypted identifiers, and
     a number indicating the number of the plurality of encrypted identifiers;
   creating, by the computing device, a single data set including each of the received data sets;
   creating, by the computing device, a common identifier vector that indicates each encrypted identifier in the single data set that has underlying unencrypted data that is the same in more than one of the received data sets, wherein the underlying unencrypted data is the same when the subtraction result of two of the plurality of identifiers is 0; and
   transmitting, by the computing device, the common identifier vector to each of the at least two or more computing devices.

12. A method for improving homomorphic encryption, the method comprising:
   receiving, by a computing device, a data set from at least two or more computing devices, each data set comprising:
     a plurality of encrypted identifiers,
     a number indicating the number of the plurality of encrypted identifiers, and
     a plurality of placeholder identifiers,
   wherein each of the plurality of placeholder identifiers appears as if it is an encrypted identifier when being transmitted from the at least two or more computing devices,
   wherein the number of the plurality of placeholder identifiers is randomly generated for each of the received data, and
   wherein the number indicating the number of the plurality of encrypted identifiers is updated to add the number of the plurality of placeholder identifiers;
   creating, by the computing device, a single data set including each of the received data sets;

creating, by the computing device, a common identifier vector that indicates each encrypted identifier in the single data set that has underlying unencrypted data that is the same in more than one of the received data sets; and transmitting, by the computing device, the common identifier vector to each of the at least two or more computing devices.

13. A system comprising at least one processor and a memory containing instructions which, when executed by the at least one processor, cause the at least one processor to:

receive, by a computing device, a data set from at least two or more computing devices, each data set comprising:
    a plurality of encrypted identifiers, and
    a number indicating the number of the plurality of encrypted identifiers;

create, by the computing device, a single data set including each of the received data sets;

create, by the computing device, a common identifier vector that indicates each encrypted identifier in the single data set that has underlying unencrypted data that is the same in more than one of the received data sets, wherein the underlying unencrypted data is the same when the subtraction result of two of the plurality of identifiers is 0; and transmit, by the computing device, the common identifier vector to each of the at least two or more computing devices.

14. A system comprising at least one processor and a memory containing instructions which, when executed by the at least one processor, cause the at least one processor to:

receive, by a computing device, a data set from at least two or more computing devices, each data set comprising:
    a plurality of encrypted identifiers,
    a number indicating the number of the plurality of encrypted identifiers, and
    a plurality of placeholder identifiers,
    wherein each of the plurality of placeholder identifiers appears as if it is an encrypted identifier when being transmitted from the at least two or more computing devices,
    wherein the number of the plurality of placeholder identifiers is randomly generated for each of the received data, and
    wherein the number indicating the number of the plurality of encrypted identifiers is updated to add the number of the plurality of placeholder identifiers;

create, by the computing device, a single data set including each of the received data sets;

create, by the computing device, a common identifier vector that indicates each encrypted identifier in the single data set that has underlying unencrypted data that is the same in more than one of the received data sets; and transmit, by the computing device, the common identifier vector to each of the at least two or more computing devices.

* * * * *